United States Patent [19]

McDermott et al.

[11] Patent Number: 5,416,280

[45] Date of Patent: May 16, 1995

[54] DIGITIZER TABLET USING RELATIVE PHASE DETECTION

[75] Inventors: Robert M. McDermott, Weston; Daniel G. Lasley, Newton, both of Conn.

[73] Assignee: Summagraphics Corporation, Austin, Tex.

[21] Appl. No.: 44,139

[22] Filed: Apr. 8, 1993

[51] Int. Cl.⁶ .................................... G08C 21/00
[52] U.S. Cl. .................................... 178/19
[58] Field of Search ................ 178/18, 19, 70; 345/156, 157, 173, 174

[56] References Cited

U.S. PATENT DOCUMENTS

| | | | |
|---|---|---|---|
| 4,705,919 | 11/1987 | Dhawan | 178/19 |
| 5,051,545 | 9/1991 | McDermott | 178/19 |
| 5,134,253 | 7/1992 | Doubrava | 178/19 |
| 5,210,380 | 5/1993 | McDermott | 178/19 |
| 5,218,174 | 6/1993 | Gray et al. | 178/187 |
| 5,251,123 | 10/1993 | Reiffel et al. | 178/19 X |

*Primary Examiner*—Stephen Chin
*Assistant Examiner*—Paul Loomis
*Attorney, Agent, or Firm*—Rosen, Dainow & Jacobs

[57] ABSTRACT

In a digitizer and method for laying out and using the tablet of the digitizer, wherein the tablet provides unambiguous binary code outputs. The digitizer may employe a cordless transducer and signal processing circuitry providing relative phase detection for determining coarse location of the transducer. An unambiguous binary code output is obtained with a grid layout which generates a set of unique binary codes, none of which is the the same or the binary inverse of any other member of the set.

27 Claims, 4 Drawing Sheets

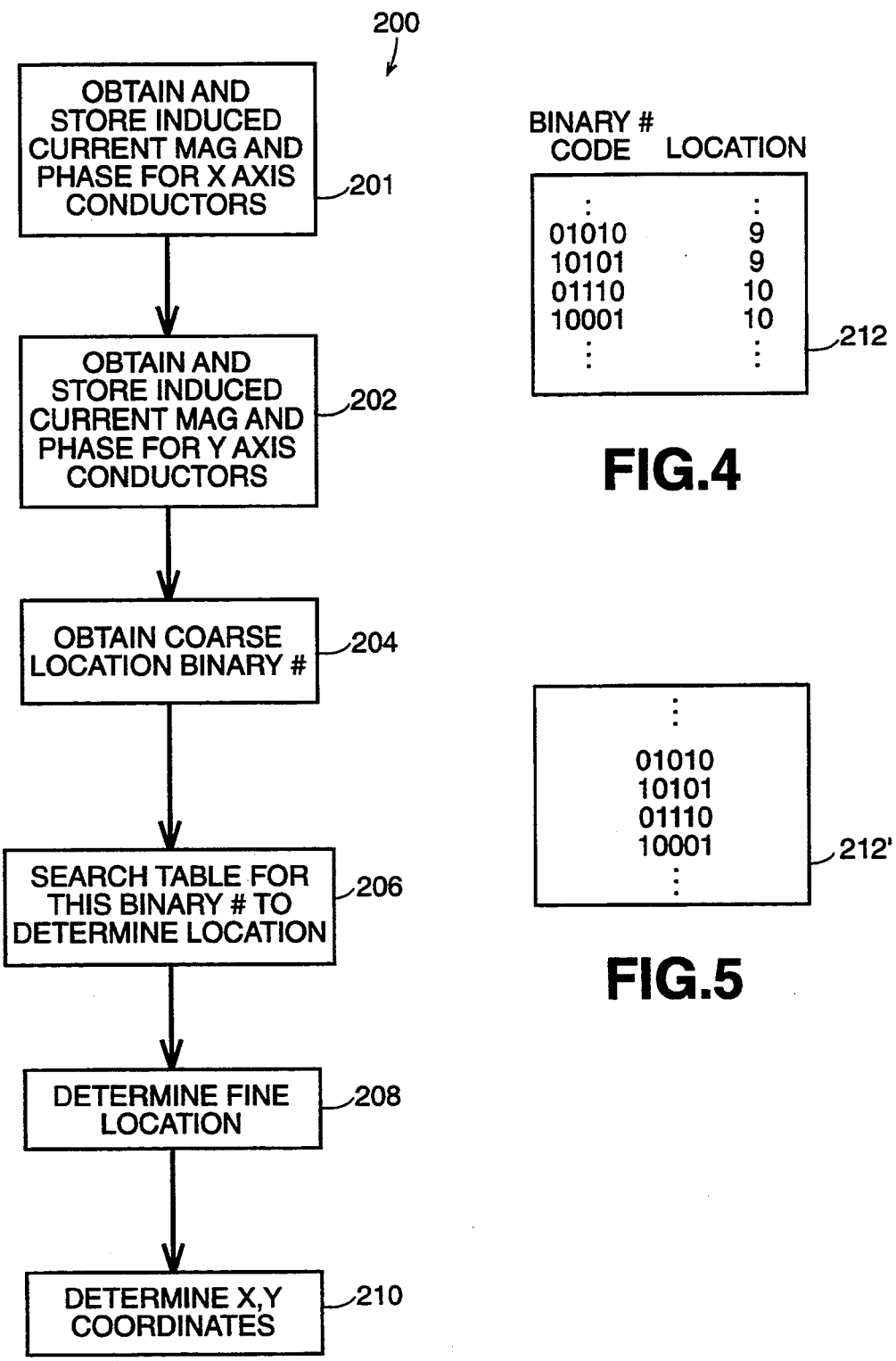

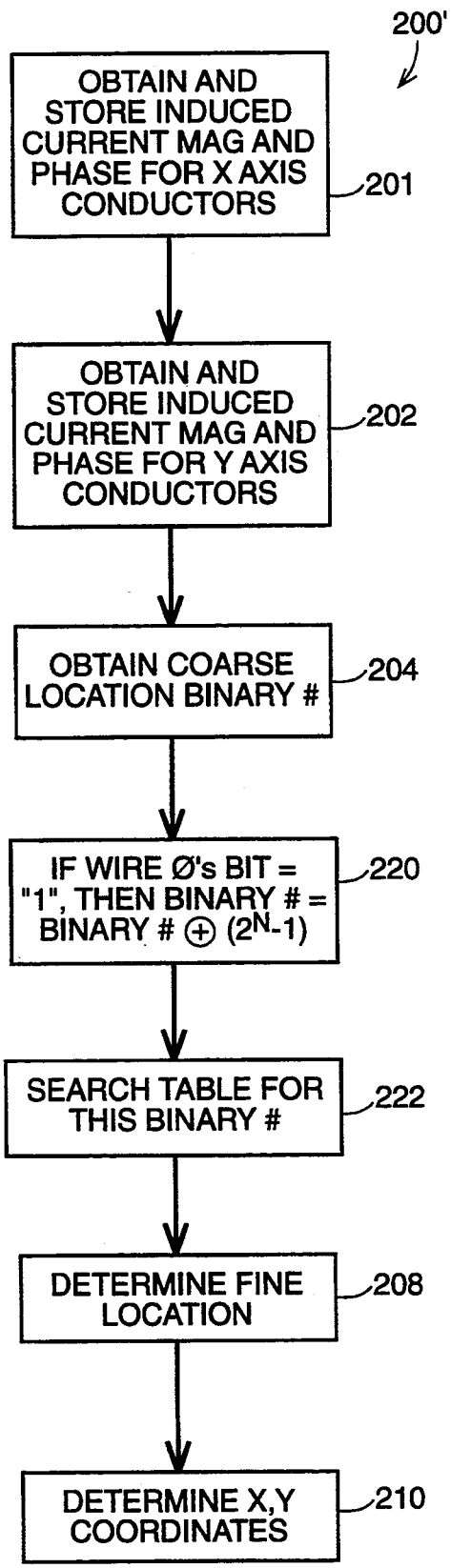
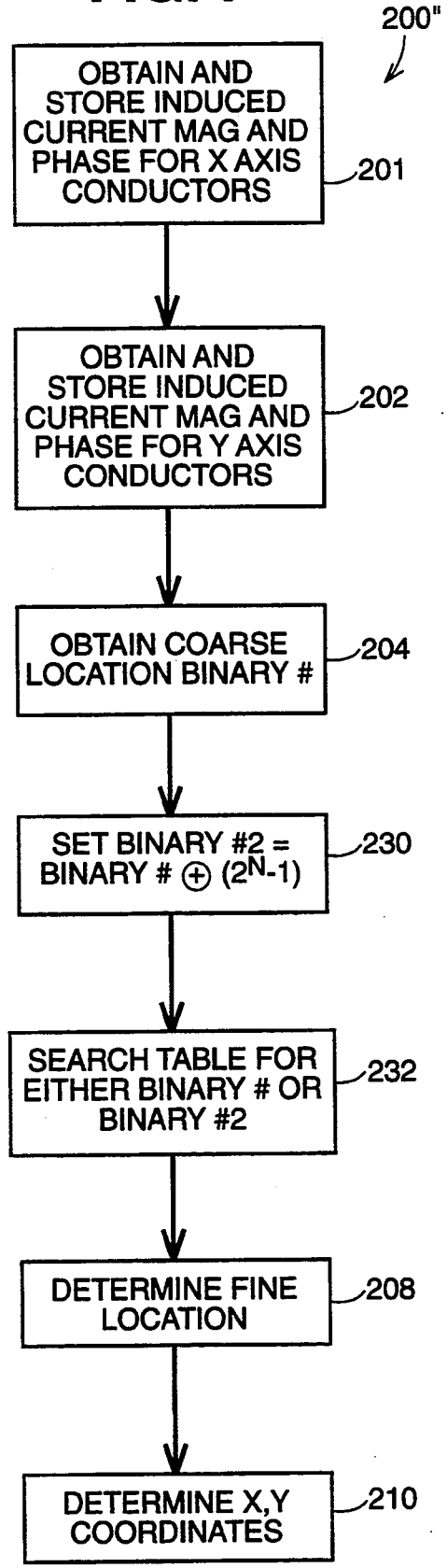

DIGITIZER TABLET USING RELATIVE PHASE DETECTION

This invention relates to digitizer tablets, as well as to methods for producing and using such tablets.

RELATED CASES

Commonly-assigned, copending application, Ser. No. 07/891,768, filed Aug. 1, 1992, entitled "CORDLESS DIGITIZER WITH SYNC SIGNAL GENERATOR", and commonly-assigned application, Ser. No. 07/741,032, filed Aug. 6, 1991, entitled "IRREGULAR, BALANCED REPEAT INCREMENT GRID" (issued as U.S. Pat. No. 5,210,380) are related to the present invention, and the contents of these applications are incorporated herein by reference.

BACKGROUND OF INVENTION

In conventional digitizer tablets, a pointing device which may be a stylus, mouse, or other form of moveable element including a transducer is employed to receive signals from a tablet grid, or the grid is employed to receive signals from a pointing device transducer. In certain grid geometries, it is necessary to provide a reference that enables the determination of the absolute phase of the received signals in order to enable determination of the transducer location.

As an example of one such grid geometry, commonly-assigned U.S. Pat. No. 5,051,545 (the '545 patent), the contents of which are incorporated herein by reference, describes a position determining apparatus and conductor structures or grid layouts therefor. The conductors are arranged for each axis of the grid in a pattern such that signals obtained for that axis may be processed to provide binary numbers in a Gray-type code. Code is produced which is unique to a separate small region of the active area over which the coil center of an electromagnetic transducer is located. The small region for a given axis corresponds to the space between two immediately adjacent, active conductor portions for that axis. Small regions in each axis therefore define the coarse location of the coil center in that axis. The '380 patent describes a modification of the structure described in the '545 patent.

Inherent in the design of the digitizers described in the '545 patent is a requirement that the "phase" of the signal from each wire must be determined. If the transducer is coupled to the system via a cord, the controller in the system transmits a signal to the transducer (or grid) and detects the received signal from the grid (or transducer). In this type of system, the necessary information is present to determine whether the received signal is in-phase or out-of-phase with the transmitted signal. The digitizer uses a coding of "0" and "1" to indicate respectively "in" phase and "out" of phase signal states for each wire, and constructs a binary number from the induced signals which it then uses to determine where the transducer is located on the surface of the grid. This encoded binary number is unique at each wire space or coarse location.

A cordless transducer for use in a digitizer generally includes an independent oscillator, and so additional means must be provided to enable determination of the phase of this oscillation, so as to be able to construct the appropriate "0" and "1" codings for the wires. The concept of self-synchronization is described in copending application, Ser. No. 891,768, particularly as a means for providing a cordless digitizer with excellent noise immunity characteristics. In one of its preferred implementations in a cursor-driven system, a sync signal is derived from signals induced in a conductor of one grid while a conductor of the other grid is sampled to derive a location signal. This implementation assumes either a known relationship between the sync signal and the sampled location signal, or that the relationship is irrelevant to the position location program.

When the phase relationship between the transmitter and receiver is not known and is important to the position-location determination, as in the system of the '545 patent, it is still possible to determine the relative phases between the signals on the different wires, but it is not possible to determine the absolute phase of the signal in any wire. For example, it is not possible to determine the difference between the signal sequence "010" and its inverse "101". Hence, it is not possible to determine unambiguously whether the transducer is over one of several possible coarse locations in the above type of grid layout.

The occurence of inverse codes, in a digitizer of the type disclosed in the '545 patent, is demonstrated by reference to the following Table I, for a digitizer having a plurality of parallel wires interconnected to form three conductors, and separated by spaces $S_1$–$S_7$. In this table it is seen that a number of the codes (in the second column) representing the spaces (in the first column), have binary inverses of other codes (in the third column) in the same set.

TABLE I

| SPACE | CODE | (Binary Inverse of Code) |
|---|---|---|
| $S_1$ | 110 | (001) |
| $S_2$ | 100 | (011) |
| $S_3$ | 101 | (010) |
| $S_4$ | 001 | (110) |
| $S_5$ | 000 | (111) |
| $S_6$ | 010 | (101) |
| $S_7$ | 011 | (100) |

Thus, space $S_1$ is the inverse of space $S_4$, denoted as $S_1 = \bar{S}_4$; $S_2 = \bar{S}_7$; $S_3 = \bar{S}_6$; $S_4 = \bar{S}_1$; only $S_5$ does not have a corresponding inverse code.

If the phase relationship between the signals of the tablet and the transducer is not known, it is not possible to determine whether, for example, the transducer is in space $S_6$ or $S_3$ in this grid layout.

SUMMARY OF INVENTION

An object of the invention is the provision of a digitizer which provides unambiguous binary code outputs, as well as a method for producing the digitizer and methods for using the digitizer.

A further object of the invention is the provision of a digitizer of the type employing a serpentine grid and which provides unambiguous binary code outputs.

Still a further object of the invention is the provision of a low cost digitizer, suitable for use with either a corded or cordless transducer, preferably scaleable to various sizes.

A further object of the invention is the provision of a position-determining device employing at least one serpentine grid and signal processing circuitry providing relative phase detection for determining coarse location of a pointing device.

Still another object of the invention is the provision of a position-determining device with good noise immunity employing at least one serpentine grid and providing for easy scaling of the grid conductor locations to encompass a wide range of device sizes.

The present invention is based upon the discovery that a digitizer can be constructed which will generate a set of unique binary codes, none of which is the binary inverse of any other member of the set. In particular, the tablet's grid construction can be constrained to be "non-reflective", in order to allow for the use of a self synchronizing scheme without the need for a known relationship between the synchronizing signal and the sampled signal.

The term "non-reflective", as used in the disclosure, is defined as a grid layout which does not produce a state which is the binary inverse of any other state in the layout.

By definition, a non-reflective grid cannot have more than $2^{(N-1)}$ unique states, wherein N is an integer equal to the conductors connected to the wires of the given grid axis. In a non-reflective grid, the relationship between the transmitted signal and received signal is irrelevant, provided that the relationship, whatever it is, remains constant from wire to wire. A variety of techniques can be employed to determine the location based on the receipt of a sequence of phases or their reflection.

A tablet in accordance with the present invention has the constraint that, for every given set of codes, no two codes of the set are either the same or the inverse of one another. A Gray code sequence can advantageously be employed for successive codes, if desired.

A feature of the invention is thus the provision of a novel grid construction for a digitizer tablet which, in cooperation with a transducer, provides signals which when processed will generate a set of unique binary codes, none of which are the binary inverse of any other member of the set, and which codes will unambiguously represent one of many coarse locations on the tablet. A tablet in accordance with the invention can, if desired, employ self-synchronizing circuitry. The invention is of particular relevance to tablets with grid constructions of the serpentine type, for example as described in the '545 patent and copending application Ser. No. 891,768. The invention may be used with tablets which generate Gray codes to identify coarse locations, as described in the '545 patent and the '380 patent.

The invention is also directed to methods for employing a non-reflective tablet, as well as to methods for developing the layout of a non-reflective tablet.

The above and other objects, aspects, features and advantages of the invention will be more readily perceived from the description of the preferred embodiments thereof taken in conjunction with the accompanying drawings and appended claims.

BRIEF DESCRIPTION OF THE DRAWINGS

The invention is illustrated by way of example and not limitation in the figures of the accompanying drawings in which like references denote the same or corresponding parts, and in which:

FIG. 3 is a flow chart of one procedure for coordinate determination in accordance with the invention;

FIGS. 4 and 5 are views of parts of look-up tables usable with the procedure depicted in FIG. 3; and FIGS. 6 and 7 are flow charts of other procedures for coordinate determination in accordance with the invention.

DETAILED DESCRIPTION OF PREFERRED EMBODIMENTS

Figure 1:
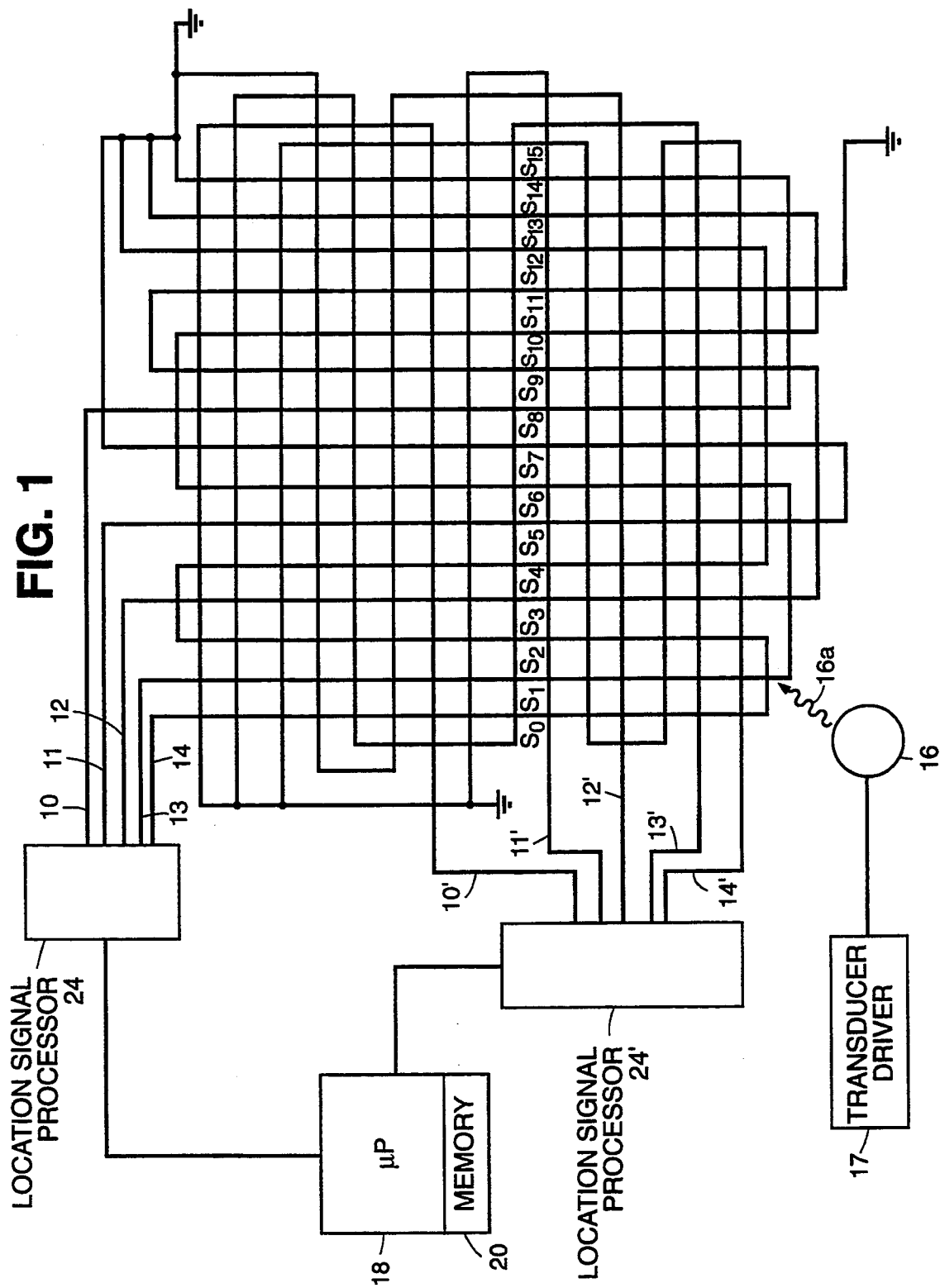
FIG. 1 is a block diagram of a system with one grid layout in accordance with the present invention.

Referring now to the drawings, FIG. 1 is an example of a non-reflective grid layout in a digitizer tablet in accordance with the invention. In this embodiment of the invention, 16 spaces $S_0$–$S_{15}$ or coarse locations are defined by 5 serpentine conductors 10–14. The block diagram of FIG. 1 is mainly schematic. Details of the blocks and other functions commonly implemented in digitizers can be found in the '545 patent and the two referenced applications.

In particular, FIG. 1 shows the five serpentine conductors 10, 11, 12, 13 and 14 of a grid positioned for determination of the location of a transducer represented by a coil 16 of a pointing device, along one coordinate axis, e.g. the X-axis. In this example, the coil 16 (or cursor) is electromagnetically coupled 16A to the grid conductors. The coil is driven by a transducer driver 17 that is isolated from the controlling microprocessor 18. The microprocessor 18 has a local memory 20. Sampled location signals derived from the X-axis grid conductors 10–14, are processed in the conventional manner by processing circuitry 24. A similar set of serpentine conductors 10'–14' is preferably provided on another coordinate axis, e.g. the Y axis, the signals on these conductors being processed by the processing circuitry 24'.

In Table II, Column 1 enumerates the 16 spaces defined by the grid conductors 1–14 of FIG. 1. Column 2 shows the binary codes generated when the transducer is located over the respective one of the 16 spaces $S_0$–$S_{14}$. Column 3 lists the respective inverse codes. As seen in Table II, there is no inverse code in column 3 that is the same as any code in column 2. Hence, either code corresponding to a space will unambiguously identify that space.

TABLE II

| SPACE | BINARY CODE | (BINARY INVERSE CODE) |
|---|---|---|
| $S_0$ | 00000 | 11111 |
| $S_1$ | 10000 | 01111 |
| $S_2$ | 11000 | 00111 |
| $S_3$ | 01000 | 10111 |
| $S_4$ | 01100 | 10011 |
| $S_5$ | 11100 | 00011 |
| $S_6$ | 11110 | 00001 |
| $S_7$ | 10110 | 01001 |
| $S_8$ | 10100 | 01011 |
| $S_9$ | 10101 | 01010 |
| $S_{10}$ | 10001 | 01110 |
| $S_{11}$ | 11001 | 00110 |
| $S_{12}$ | 11101 | 00010 |
| $S_{13}$ | 01101 | 10010 |
| $S_{14}$ | 00101 | 11010 |
| $S_{15}$ | 00100 | 11011 |

The relationship between the transmitted signal and received signal is irrelevant in a non-reflective grid in accordance with the present invention (provided, of course, that the relationship, whatever it is, remains constant from wire to wire). A variety of techniques can be employed to determine the location based on the receipt of a sequence of phases or their reflections. Three techniques in accordance with the invention for determining the location of the pointer on a non-reflective grid are as follows below:

1. A table is created listing both the inverse and non-inverse binary codes for each location of the pointer. For example, in the 5 wire non-reflective grid layout of FIG. 1, table II, both "10101" and "01010" indicate a location of $S_9$. In this method, the received code corresponding to the position of the transducer is compared with the inverse and/or the non-inverse codes of the table to locate the position corresponding to the received signal.

2. In this method, an assumption is made that a specific one of the conductors always has a predetermined phase. If the detected phase of that conductor is not the predetermed phase, then the phase of the detected code sequence is inverted. In other words, the phases of the conductors, as detected, are forced to be relative to the given conductor. For example, if the first conductor is selected as the "reference" conductor, and the phase of this conductor is assumed to always be a "0", then the detected phases of conductors that are the same as the reference conductor are then coded to be "0" and the detected phases of conductors that are opposite to that of the reference conductor are coded as "1". A table, such as Table III, is generated showing the correspondence between the received codes and the respective spaces on the tablet. As all example, Table III may be derived from the codes of Table II, selecting only those codes in which the phase of the first conductor is "0" As an example, the receipt of what normally might have been a "10101" is be converted to the inverse, "01010", to force the phase of the corresponding first conductor to "0". In this case, the inverted code is used to determine the location, for example, of space $S_9$. Forcing the most significant bit of the binary code to a "0" guarantees that every inverse code has a "1" as its most significant bit, and therefore could not be the same as any binary code. It is of course apparent that the invention is not limited to forcing the most significant bit in this manner, since any other bit can be employed for this purpose.

TABLE III

| SPACE | BINARY CODE |
| --- | --- |
| $S_0$ | 00000 |
| $S_1$ | 01111 |
| $S_2$ | 00111 |
| $S_3$ | 01000 |
| $S_4$ | 01100 |
| $S_5$ | 00011 |
| $S_6$ | 00001 |
| $S_7$ | 01001 |
| $S_8$ | 01011 |
| $S_9$ | 01010 |
| $S_{10}$ | 01110 |
| $S_{11}$ | 00110 |
| $S_{12}$ | 00010 |
| $S_{13}$ | 01101 |
| $S_{14}$ | 00101 |
| $S_{15}$ | 00100 |

3. In the third method for determining the location of the transducer, a table is provided that lists either the inverse or the non-inverse codes. Since the grid is non-reflective, it is insured that both the original code and its inverse uniquely identify only one location. Then, if the received signal code is not found in the table, the received signal code is inverted and compared again with the stored table values to determine the location of the transducer.

Of the three above discussed methods, the second is preferred for efficiency in ROM table size and look-up time efficiency, although the first and thirds methods may be more intuitive and may be preferred for ease of understanding and subsequent support.

An example of a method in accordance with the invention for laying out a non-reflective grid pattern will now be described with reference to the flow diagram of FIG. 2.

Figure 2:
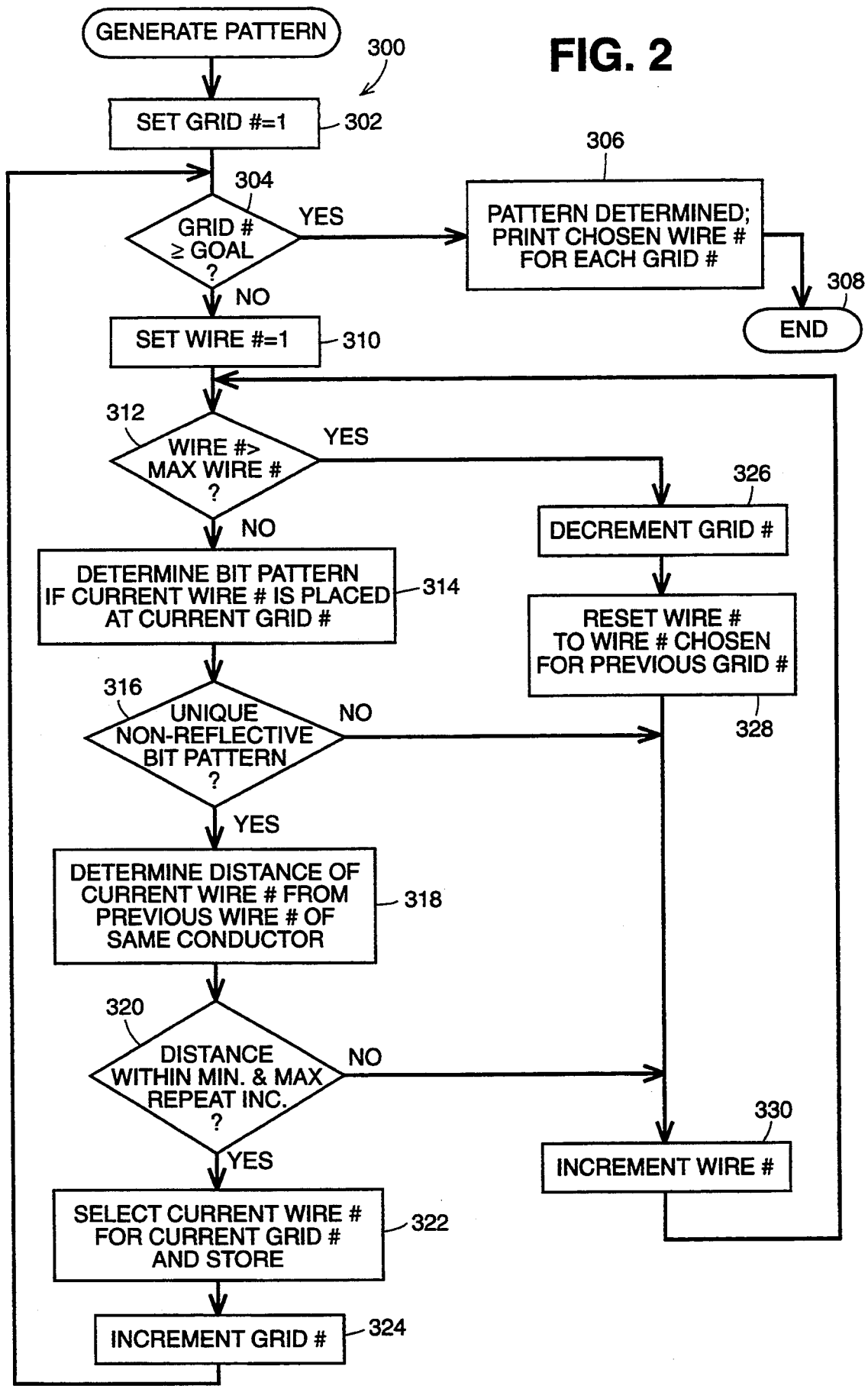
FIG. 2 is a flow chart of a procedure for laying out a grid in accordance with the invention.

FIG. 2 is a flow chart of "generate pattern" routine 300 for laying out a grid conductor pattern for an axis of a serpentine grid. The following parameters employed in the program are selected by the designer:

1. The total number of grid line locations (i.e. conductor runs, each conductor run having a plurality of active grid "wires") that are to be employed on the tablet. This number is referred to as "goal grid #". The grid line locations are sequentially numbered.

2. The maximum number of active grid wires, referred to as "max wire #";

3. The minimum repeat increment "$R_{min}$", i.e. the minimum distance between wires of a common conductor; and 4. The maximum repeat increment "$R_{max}$", i.e. the maximum distance between wires of a common conductor.

The "generate pattern" routine 300 determines and prints a grid pattern which satisfies the above requirements. In this routine, step 302 sets the grid line location to #1, i.e., sets the location of the first conductor active portion to the first grid line location. Step 304 determines if the highest grid line location designated is greater than or equal to the goal grid line location (goal grid #). If it is, the routine considers that a pattern has been determined which satisfies the goals and repeat maximum and minimum increments. In step 306 the pattern is printed, and the program ends as step 308.

If the highest grid line location designated is not greater than or equal to the goal grid #, as determined at step 304, then the routine proceeds to step 310 in which the conductor number is set to #1. In step 312, a determination is made of whether or not the number of grid conductors exceeds the maximum number of conductors (max wire #). If it does not, the routine proceeds to step 314, which determines the bit pattern (binary number) of the overall pattern generated to this point including the conductor active portion placed at the last grid line location considered.

Step 316 determines if that binary number is unique and non-reflective, i.e., whether that binary number was generated already for a previous stage of the pattern and whether it satisfies the non-reflective definition. If it is unique and non-reflective, then in step 318 the distance between this last placed conductor active portion and the adjacent one for the same conductor, i.e., the last repeat increment for that conductor, is determined. If that repeat increment is within the minimum and maximum repeat increments, as determined in step 320, then in step 322, that conductor is selected for that grid line location, and the information is stored. The grid line location is then incremented in step 324 and the routine proceeds to step 304 to determine the conductor to be placed in the next grid line location (steps 310–324) or the grid pattern is printed and the routine stopped (steps 306–308).

If, in step 312, the conductor number exceeds the max wire #, then the routine proceeds to step 326 in which the grid line location number is decremented. If the decremented grid line number in step 326 is zero, then a desired grid pattern is not possible within the goal parameters. In step 328, the conductor number is reset back to the one selected for the decremented grid line location. Step 330 then increments the conductor number and the routine proceeds to step 312. The loop formed by steps 326, 328 and 330 is cycled, and the grid line location decremented until the conductor number is less than the max wire #, as determined in step 312. This loop enables the routine to back track to a particular point and then process forward with a different pattern until a desired grid pattern is determined. Thus, the routine does not have to look forward but is allowed to proceed until it determines that the pattern generated to that point does not satisfy the goals, at which point, the routine back tracks.

If, in step 320, the minimum and maximum repeat increments are not satisfied, the conductor number is incremented and the next conductor tried starting with step 312.

The routine shown in the flow chart in FIG. 2 will provide one grid pattern satisfying the goal parameters. There may be others, which may be determined with the aid of already-generated grid patterns, or by use of other routines, or by modifying the FIG. 2 routine. For example, in addition to the maximum and minimum repeat increment constraints for the serpentine grid conductor example, the constraint on the maximum change in repeat increment between consecutive runs of a conductor may be imposed to enhance the cancellation effect of induced currents for runs adjacent the one closest to the coil center as described in the patent. As will be clear from the above, it is easier to generate desired grid patterns when a number of conductors exceeding the absolute minimum required is utilized.

The flow chart of FIG. 3, illustrates a program 200 for the determination of coordinates, in accordance with an embodiment of the invention. In this program, magnitudes and phases are obtained for the current signals induced in coil 16 (FIG. 1) when each of the sixteen conductors of the X axis grid conductors 10-14 and the Y axis grid conductors (not shown) are sequentially driven. This is done for the position of coil 16 over the tablet's active area. These magnitude and phase signals are temporarily stored in internal registers of microprocessor 18 according to routines 201 and 202. The voltages induced in coil 12 will be of one polarity when the coil is positioned over a space bounded by conductors with clockwise current, and of the opposite polarity when positioned over a space bounded by conductors with clockwise current. As described in the '545 patent, for a cursor-driven system, each grid conductor is sequentially coupled to a current sensing amplifier, which interjects a dc offset to the sensed current signals and amplifies the sensed current signals, providing voltage output signals proportional to the amplified current signals. These voltage signals are then supplied to an A/D converter which converts the positive analog voltages to digital signals and supplies them to the microprocessor 18 which causes the digital representations of the analog voltages to be stored in internal registers. This known signal processing is represented by block 24 in FIG. 1. The location signal processing is coordinated with the synchronization signal processing as described in the referenced pending application.

The binary number described above which represents the coarse location of the center of coil 16 within a particular space or regions between two immediately adjacent conductor active portions for the X axis and for the Y axis is then determined by microprocessor 18 according to routine 204. The microprocessor 18 makes such a determination by ordering the phases of the stored voltage signals in accordance with the multiplexing sequence of the grid conductors for each axis.

The binary numbers obtained in routine 204 are indexed by microprocessor 18 according to routine 206 in a look-up table 212 (FIG. 4) contained in memory 20, which supplies the coordinates of the coarse location, i.e., the particular region between conductor active portions for each axis in which the center of coil 16 lies. If mathematical interpolation is used to determine fine location, the indexed location of the ROM look-up table 212 can also identify the conductors which are to be used in the fine location determination for each axis.

However, fine location may also be determined largely independently of the coarse position determination. For example, a number of different techniques may be used for fine position determination. Microprocessor 18 determines fine position according to routine 208.

Microprocessor 18 in routine 210 then determines the precise X and Y coordinates of the cursor from the coarse and fine location determination for each axis.

As will be observed in connection with the flow chart of FIG. 2, at step 316, the bit pattern obtained during step 314 is tested not only for uniqueness but also whether it is non-reflecting. The latter is easily accomplished by inverting each of the bits and comparing against the bit patterns assigned to the other wires. A branch is then taken depending upon the outcome of the test.

The first of the above described three implementation examples of the invention uses the routine depicted in FIG. 3. As will be observed, when the coarse location binary number is obtained at step 204, the location table 212 (FIG. 4) is searched at step 206 to determine the coarse location. The location table 212 created in the first implementation requires location uniqueness not only of the binary number obtained in step 204 but also of its inverse. In other words, the binary number and its inverse will identify the same coarse location, and will also differ from any other binary number and its inverse representing another location in the same set. This is schematically illustrated in FIGS. 4 and 5.

FIG. 4 shows part of the content of the location table 212. In this table, location 9 is identified both by a binary code and its inverse (Table II). The same is true for location 10. The codes in the left column will be unique; there are no duplicates.

The table in FIG. 4 is an example of explicit location coding. The binary code is used as an index to the table. When a match is found, the coarse location is outputted.

FIG. 5 is an example of implicit location coding for the same first implementation. In this case, the table 212' contains only each binary code and its inverse in consecutive location order. The memory address of each location therefore equals the sum of the start of table address and 2×the location number. In use, when a match is found in the table 212' between the tablet-generated binary code and the binary code in the FIG. 5 table, then the location is computed using the formula:

location number=Integer (Binary Code Address−Table Start Address)/2

A flow chart for the preferred second implementation is depicted in FIG. 6 (with the same reference numerals designating similar elements), and uses a look-up table generated by, for example, setting the first wire as a reference to "0", and coding wires opposite to the first wire as "1". Thus, the coding scheme depicted in the second column of Table II is modified as shown in Table III.

As will be noted, by this forcing scheme, where one bit is always a "0" (or "1"), it guarantees that the corresponding bit in all the inverse codes are of the opposite value (a "1" or a "0") and will not be identical to any of the assigned codes.

To carry out this second implementation using Table III, after the tablet-generated binary number is obtained in step 204 of FIG. 6, then block 220 is entered, which, if the reference bit is not 0, computes the exclusive-or (represented by the symbol $\oplus$) of the binary number and the binary representation of $(2^N-1)$, where N=number of wires, and assigns this to binary #. Then, column 2 of Table III is searched in step 222 for a match with binary #, and if found the coarse location in column 1 is outputted.

The third implementation uses the binary code scheme depicted in Table II. The flow chart for using Table II is depicted in FIG. 7. After the tablet-generated binary # is obtained at step 204, a new variable, binary #2, is created and assigned a value at step 230 equal to the exclusive-or of binary # and this binary representation of $(2^N-1)$, where N, again, is the number of wires. Next, at step 232, Table II, center column, is searched for a match with either binary # or binary #2. If a match is found, then the coarse location from the left column is outputted.

It will be evident to those skilled in the art that the invention is not limited to the three above discussed implementations, and that other layout and location-determination schemes following the principles described herein can readily be devised and are considered within the scope of the present invention.

By constructing a grid layout in accordance with the invention which does not contain states which are "reflections" (inverses) of other states, relative phase, rather than absolute phase, can be used to determine the transducer location. In cordless implementations, relative phase detection is normally be less costly than absolute phase detection. The preferred cordless embodiment is typically be cursor-driven. The application of the invention eliminates the need for absolute phase detection in a cordless environment. Using the serpentine approach also provides for easy scaling of tablets to size.

While absolute phase detection is not necessary in the method and apparatus of the invention, it will be understood that the present invention can also be used in a cordless system that does provide a way of synchronizing the transducer drives pulses to the tablet current detectors for the purpose of improving the signal-to-noise ratio. One such technique employs FM radio transmission by the pointing device of synchronizing information, which is detected by a radio receiver in the tablet, and which is described in a copending, commonly-assigned patent application, Ser. No. 864,665, filed Apr. 7, 1992.

Certain changes and modifications of the embodiments of the invention herein disclosed will be readily apparent to those of average skill in the art. Moreover, uses of the invention other than for coordinate determination in a digitizer system will also be readily apparent to those of skill in the art. It is the applicants' intention to cover by the claims all such uses and all those changes and modifications which could be made to the embodiments of the invention herein chosen for the purposes of disclosure which do not depart from the spirit and scope of the invention.

What is claimed is:

1. A conductor structure for a position-determining device which includes a movable element and determines the location of said movable element relative to said conductor structure;
    said conductor structure comprising;
    a plurality of conductors having active portions each extending substantially in a first direction substantially in or adjacent a common plane substantially parallel to each other and defining a plurality of spaces between adjacent active portions of the conductors;
    said conductors being arranged in a pattern such that:
        (a) each of said active portions of all of said conductors or spaces therebetween are uniquely identified by one or more unique binary numbers of a coding set of binary numbers, respective binary digits of each of said unique binary numbers corresponding to respective conductors, upon interaction between said movable element and respective conductors, binary logic signals may be obtained corresponding to said binary digits which are indicative of the location of said movable element relative to said conductor structure;
        (b) said binary numbers of the coding set allocated to the conductors or spaces therebetween are such that the inverse binary number of any member of the set is different from the binary number of all other members of the set.

2. The structure of claim 1, wherein the coding set of binary numbers constitutes a Gray code.

3. The structure of claim 1, wherein one bit of each coding set binary number is the same as the corresponding bit in the same position of all the other binary numbers in the set.

4. A conductor structure for a position-determining device which includes a movable element and determines the location of said movable element relative to said conductor structure;
    said conductor structure comprising;
    a plurality of serpentine conductors each of which includes plural active portions extending substantially in a first direction substantially in or adjacent a common plane substantially parallel to each other and defining spaces between adjacent active portions of the conductors;
    said conductors being arranged in a pattern such that:
        (a) each of said active portions of all of said conductors or spaces therebetween being uniquely identified by one or more unique binary numbers of a coding set of binary numbers, respective binary digits of each of said unique binary numbers corresponding to respective conductors, upon interaction between said movable element and respective conductors, binary logic signals may be obtained corresponding to said binary digits which are indicative of the location of said movable element relative to said conductor structure;
        (b) said binary numbers of the coding set allocated to the conductors or spaces therebetween being such that the inverse binary number of any member of the set is different from the binary number of all other members of the set.

5. A digitizer comprising:
   (a) a tablet
   (b) a pointing device,
   (c) a grid structure extending over an active region of the tablet for cooperating with the pointing device to generate electrical signals induced in one of the grid structure or pointing device when the other is activated, said grid structure comprising:
      (i) at least first and second conductors each having conductor portions extending in one coordinate direction and along one span in another direction of the active region to define pointing device coarse positions along said other coordinate direction,
      (ii) said conductors being arranged in a pattern such that each of said coarse positions is uniquely identified by a unique binary number, respective binary digits of each of said unique binary numbers corresponding to respective conductors, each binary number being unique with respect to all other binary numbers and their inverse binary numbers;
   (d) means for deriving a synchronization signal representing the relative phase of the electrical signals,
   (e) means for processing said electrical signals together with the synchronization signal for generating the binary number corresponding to the coarse position where the pointing device is located;
   (f) means for processing the generated binary number for identifying the coarse position where the pointing device is located.

6. A digitizer comprising:
   (a) a tablet;
   (b) a pointing device,
   (c) a grid structure extending over an active region of the tablet for cooperating with the pointing device to generate electrical signals induced in one of the grid structure or pointing device when the other is activated, said grid structure comprising:
      (i) at least first and second serpentine conductors each having conductor portions extending in adjacent pairs back and forth at least two times in one coordinate direction and along one span in another direction of the active region to define at least four pointing device coarse positions along said other coordinate direction between adjacent conductor portions of the pair,
      (ii) said conductors being arranged in a pattern such that each of said coarse positions is uniquely identified by a unique binary number, respective binary digits of each of said unique binary numbers corresponding to respective conductors, each binary number being unique with respect to all other binary numbers and their inverse binary numbers;
   (d) means for processing said electrical signals for generating the binary number corresponding to the coarse position where the pointing device is located; and
   (e) means for processing the generated binary number for identifying the coarse position where the pointing device is located.

7. The digitizer of claim 6, further comprising means for deriving a synchronous signal when the grid structure or pointing device is activated, and means for processing the synchronous signal in coordination with the said electrical signals.

8. The digitizer of claim 6, wherein the means for processing of claim element (d) comprises means for measuring the magnitude and polarity of the said electrical signals.

9. The digitizer of claim 6, wherein the means for processing of claim element (e) comprises a look-up table.

10. The digitizer of claim 7, wherein the means for deriving a synchronous signal comprises a portion of the grid structure.

11. The digitizer of claim 6, further comprising means for determining the relative phase of the induced signals.

12. The digitizer of claim 6, wherein the pointing device is cordless.

13. A method for laying out a grid structure for a digitizer tablet, said grid structure comprising a plurality of conductors each of which includes an active portion extending substantially in a first direction substantially in or adjacent a common plane substantially parallel to each other and defining plural spaces adjacent active portions of the conductors, comprising the steps of:
   laying out said conductors in a pattern such that each of said conductors or spaces therebetween is uniquely identified by one or more unique binary numbers of a coding set of binary numbers, respective binary digits of each of said unique binary numbers corresponding to respective conductors, and upon interaction between a movable element and respective conductors, binary logic signals may be obtained corresponding to the position of said movable element relative to said conductor structure, each of said binary numbers being unique with respect to all the other binary numbers and their inverse binary numbers.

14. The method of claim 13, further comprising generating a look-up table containing said binary numbers from which table the location of the movable element can be unambiguously determined.

15. The method of claim 14, wherein the look-up table includes each unique binary number and its inverse, both indicative of the same location.

16. The method of claim 13, further comprising generating a look-up table containing the exclusive-or of each of said binary numbers and its inverse.

17. The method of claim 16, wherein the look-up table contains the said binary numbers for indicating some of the locations.

18. A method for laying out a grid structure for a digitizer tablet, said grid structure comprising a plurality of serpentine conductors each of which includes at least plural active portions extending substantially in a first direction substantially in or adjacent a common plane substantially parallel to each other and defining plural spaces adjacent active portions of the conductors, comprising the steps of:
   laying out said conductors in a pattern such that each of said conductors or spaces therebetween is uniquely identified by one or more unique binary numbers of a coding set of binary numbers, respective binary digits of each of said unique binary numbers corresponding to respective conductors, and upon interaction between a movable element and respective conductors, binary logic signals may be obtained corresponding to the position of said movable element relative to said conductor structure, each of said binary numbers being unique with respect to all the other binary numbers and their inverse binary numbers.

19. The method of claim 18, further comprising generating a look-up table containing said binary numbers from which table the location of the movable element can be unambiguously determined.

20. A conductor structure for a position-determining device which includes a movable element and determines the location of said movable element relative to said conductor structure;
said conductor structure comprising;
a plurality of substantially parallel spaced apart wires extending in a first direction adjacent a common plane and defining a plurality of spaces between wires;
said wires defining a plurality of groups of wires, with each said group being comprised of a separate plurality of serially connected said wires;
each of said groups of wires being uniquely identifible by either of first or second binary states in dependence on the relative position of said movable element with respect to said conductor structure, whereby the states of said groups define a multi-digit binary code;
the wires of said conductor groups being arranged so that the binary code is uniquely dependent upon the relative position of the movable element with respect to said conductor structure, and the inverse of the binary code corresponding to every position of the movable element is different from the binary number and inverse of the binary number corresponding to every position of the movable element.

21. A digitizer comprising:
(a) a tablet
(b) a pointing device,
(c) a plurality of substantially parallel spaced apart wires extending in a first direction adjacent a common plane and defining a plurality of spaces between wires, said wires defining a plurality of groups of wires, with each said group being comprised of a separate plurality of serially connected said wires, each of said groups of wires being uniquely identifible by either of first or second binary states in dependence on the relative position of said pointer with respect to said conductor structure, whereby the states of said groups define a multidigit binary code;
(d) the wires of said wire groups being arranged so that the binary code is uniquely dependent upon the relative position of the pointer with respect to said conductor structure, and the inverse of the binary code corresponding to every position of the pointer is different from the binary number and inverse of the binary number corresponding to every position of the pointer.

22. A method for laying out a non-reflective grid structure for a digitizer tablet adapted to cooperate with a pointer to determine the location of the pointer, said grid structure comprising a plurality of serpentine conductors each of which includes at least a plurality of wires extending substantially in a first direction substantially in or adjacent a common plane substantially parallel to each other, with spaces adjacent active portions of the conductors, each of said groups of conductors being uniquely identifible by either of first or second binary states in dependence on the relative position of said pointer with respect to said conductor structure, whereby the states of said groups define a multidigit binary code and the wires of said conductor groups are arranged so that the binary code is uniquely dependent upon the relative position of the movable element with respect to said conductor structure, said method comprising arranging said wires so that the inverse of the binary code corresponding to every position of the pointer is different from the binary number and inverse of the binary number corresponding to every position of the pointer.

23. The method of claim 22 wherein said step of arranging comprises sequentially selecting said wires to define each group, determining, upon each selection, whether the respective group defines a unique non-reflective pattern with respect to previously selected wires, and deselecting each selected wire in response to a determination that the respective group does not define a unique non-reflective pattern with respect to the previously selected wires.

24. The method of claim 23 wherein said step of selecting wires comprises sequentially selecting wires for a respective group, and, when wires for said respective group have been selected, then selecting wires for another of said groups.

25. A method for determining the location of a movable element in a position-determining device which includes a movable element and determines the location of said movable element relative to said conductor structure, wherein the conductor structure comprises a plurality of substantially parallel spaced apart wires extending in a first direction adjacent a common plane and defining a plurality of spaces between wires, said wires defining a plurality of groups of wires, with each said group being comprised of a separate plurality of serially connected said wires, and each of said groups of conductors are uniquely identifiable by either of first or second binary states in dependence on the relative position of said movable element with respect to said conductor structure, whereby the states of said groups define a multidigit binary code, and the wires of said wire groups are arranged so that the binary code is uniquely dependent upon the relative position of the movable element with respect to said conductor structure and the binary code is non-reflective; said method comprising:
providing a table of the binary codes and inverses thereof for every position of the movable element;
detecting the binary code corresponding to the current position of the movable element; and
comparing the said detected code with one of said codes and inverses thereof in said table, and, if a comparison is not found, comparing said detected code with the other of said codes and inverses thereof in said table.

26. A method for determining the location of a movable element in a position-determining device which includes a movable element and determines the location of said movable element relative to said conductor structure, wherein the conductor structure comprises a plurality of substantially parallel spaced apart wires extending in a first direction adjacent a common plane and defining a plurality of spaces between wires, said wires defining a plurality of groups of wires, with each said group being comprised of a separate plurality of serially connected said wires, and each of said groups of wires are uniquely identifible by either of first or second binary states in dependence on the relative position of said movable element with respect to said conductor structure, whereby the states of said groups define a multidigit binary code, and the wires of said wire groups are arranged so that the binary code is uniquely dependent upon the relative position of the movable element with respect to said conductor structure and the binary code is non-reflective; said method comprising:

providing a table of the binary codes a for every position of the movable element;
  detecting the binary code corresponding to the current position of the movable element; and
  comparing the said detected code with the binary codes stored in said table, and, if a comparison is not found, inverting said detected code and comparing said inverted detected code with the binary codes.

27. A method for determining the location of a movable element in a position-determining device which includes a movable element and determines the location of said movable element relative to said conductor structure, wherein the conductor structure comprises a plurality of substantially parallel spaced apart wires extending in a first direction adjacent a common plane and defining a plurality of spaces between wires, said wires defining a plurality of groups of wires, with each said group being comprised of a separate plurality of serially connected said wires, and each of said groups of wires are uniquely identifible by either of first or second binary states in dependence on the relative position of said movable element with respect to said conductor structure, whereby the states of said groups define a multidigit binary code, and the wires of said wires groups are arranged so that the binary code is uniquely dependent upon the relative position of the movable element with respect to said conductor structure and the binary code is non-reflective; said method comprising:

selected one of said wire groups;
  providing a table of the binary codes for every position of the movable element, with the selected wire group having a predetermined state;
  detecting the binary code corresponding to the current position of the movable element;
  if the detected code of the selected group has the predetermined state, comparing the said detected code with the codes of said table,
  if the detected code of the selected wire group does not have said predetermined state, inverting said detected code and comparing it with the codes of said table.

* * * * *

UNITED STATES PATENT AND TRADEMARK OFFICE
CERTIFICATE OF CORRECTION

Page 1 of 2

PATENT NO. : 5,416,280
DATED : May 16, 1995
INVENTOR(S) : Robert B. McDermott et al.

It is certified that error appears in the above-indentified patent and that said Letters Patent is hereby corrected as shown below:

On the Title Page, in the "Abstract", lines 3 and 4, change "em-ploye" to --employ--; line 9, delete the first "the".

Column 2, line 22, change "occurence" to --occurrence--.

Column 5, line 13, change "predetermed" to --predetermined--.

Column 5, line 25, change "all" to --an--.

Column 5, line 29, after "is" insert --to--.

Column 5, line 68, change "thirds" to --third--.

Column 9, line 42, delete "be".

Column 9, line 44, delete "be".

UNITED STATES PATENT AND TRADEMARK OFFICE
CERTIFICATE OF CORRECTION

PATENT NO. : 5,416,280
DATED : May 16, 1995
INVENTOR(S) : Robert B. McDermott et al.

It is certified that error appears in the above-indentified patent and that said Letters Patent is hereby corrected as shown below:

Column 13, line 65, change "identifible" to --identifiable--.

Column 14, line 65, change "identifible" to --identifiable--.

Signed and Sealed this

Ninth Day of April, 1996

*Attest:*

BRUCE LEHMAN

*Attesting Officer*     Commissioner of Patents and Trademarks